(12) United States Patent
Ortmann et al.

(10) Patent No.: US 9,663,383 B2
(45) Date of Patent: *May 30, 2017

(54) PROCESS FOR PREPARING CHROMIUM(III) OXIDE

(75) Inventors: Rainer Ortmann, Cologne (DE); Matthias Stenger, Monheim (DE); Matthias Boll, Cologne (DE); Holger Friedrich, Newcastle (ZA)

(73) Assignee: LANXESS Deutschland GmbH, Cologne (DE)

(*) Notice: Subject to any disclaimer, the term of this patent is extended or adjusted under 35 U.S.C. 154(b) by 120 days.

This patent is subject to a terminal disclaimer.

(21) Appl. No.: 13/635,963

(22) PCT Filed: Mar. 23, 2011

(86) PCT No.: PCT/EP2011/054407
§ 371 (c)(1),
(2), (4) Date: Apr. 30, 2013

(87) PCT Pub. No.: WO2011/117274
PCT Pub. Date: Sep. 29, 2011

(65) Prior Publication Data
US 2013/0216471 A1     Aug. 22, 2013

(30) Foreign Application Priority Data

Mar. 23, 2010 (EP) .................................. 10157422
Dec. 8, 2010 (EP) .................................. 10194157

(51) Int. Cl.
C01G 37/00 (2006.01)
C01G 37/033 (2006.01)
C09C 1/34 (2006.01)

(52) U.S. Cl.
CPC ........... *C01G 37/033* (2013.01); *C01G 37/00* (2013.01); *C09C 1/346* (2013.01); *C01P 2006/80* (2013.01)

(58) Field of Classification Search
CPC .................................................... C01G 37/033
USPC ................................................. 423/707, 607
See application file for complete search history.

(56) References Cited

U.S. PATENT DOCUMENTS

| | | | |
|---|---|---|---|
| 1,893,761 A | 1/1933 | Caspari | |
| 2,431,075 A * | 11/1947 | Parsons | C22B 34/32 23/302 R |
| 3,723,611 A | 3/1973 | Hahnkamm et al. | |
| 4,052,225 A | 10/1977 | Mansmann et al. | |
| 4,230,677 A | 10/1980 | Kagetsu et al. | |
| 4,235,862 A | 11/1980 | Rambold et al. | |
| 4,804,528 A * | 2/1989 | Warren | 423/607 |
| 6,348,538 B1 * | 2/2002 | Buhl et al. | 524/513 |
| 2002/0073895 A1 * | 6/2002 | Barnes et al. | 106/451 |
| 2009/0136402 A1 * | 5/2009 | Heldebrant et al. | 423/210 |

FOREIGN PATENT DOCUMENTS

| | | |
|---|---|---|
| CN | 1310132 A | 8/2001 |
| CN | 1418821 A | 5/2003 |
| CN | 1418822 A | 5/2003 |
| CN | 100375717 C | 3/2008 |
| CN | 101475217 A | 7/2009 |
| GB | 748610 | 5/1956 |
| RU | 2258039 C | 8/2005 |
| SU | 267611 A1 | 4/1970 |
| SU | 322315 A1 | 11/1971 |

OTHER PUBLICATIONS

Bai et al., Synthesis and Characterization of Ultra-fine Cr2O3 from Hydrogen Reduction of K2CrO4, 2008, Journal of Wuhan University of Technology-Mater. Sci. Ed., 181-183.*
CN 101475217 Machine Translation.*
Sampath et al., "Thermochemical studies in the sodium-chromium-oxygen system", Abstract, Thermochimica Acta, vol. 159, 1990, pp. 327-335, available at http://www.sciencedirect.com/science/article/pii/0040603190801 18I on 8/6/203.
Posin, "Technology of mineral salts (fertilizers, plant protection products, industrial salts, oxides and acids)", Abstract, Ch. 1.-L.: Chemistry, 1974, p. 571.
Database WPI, Week 200951, Thomson Scientific, London, GB, AN 2009-L61883, XP002586988.
Poljak, et al., "Reduction of the salts of hexavalent chromium with ammonia", 1957.
Trudy, Ural. Nauch-Issledovatel Khim. Inst., vol. 4, 1957, pp. 30-32.
International Search Report from International Application PCT/EP2011/054407, dated Apr. 26, 2011, 4 pages.
European Search Report from European Application EP10157422, dated Jun. 16, 2010, 2 pages.

* cited by examiner

*Primary Examiner* — Matthew E Hoban
*Assistant Examiner* — James Fiorito

(57) ABSTRACT

The present invention relates to a process for preparing chromium(III) oxide by reaction of alkali metal chromate with gaseous ammonia, subsequent hydrolysis, isolation of the hydrolysis product and calcination.

16 Claims, No Drawings

PROCESS FOR PREPARING CHROMIUM(III) OXIDE

The invention relates to a process for preparing chromium (III) oxide from alkali metal chromates and gaseous ammonia, and also the use of the chromium(III) oxide prepared for various applications.

Chromium(III) oxide is a versatile product with a wide range of uses. Thus, it can be used as pigment for colouring various media, for example building materials, plastics, paints & varnishes, glasses or ceramics. This field of use requires a very low content of water-soluble impurities.

In addition, chromium(III) oxide is also used in abrasives and high-temperature-resistant materials. For use of chromium(III) oxide in high-temperature-resistant materials, a very low alkali metal content is desirable in order to suppress the oxidation of Cr(III) to alkali metal chromate, which is favoured at high temperatures and in the presence of alkali metal ions, as far as possible.

A further important industrial field of use for chromium (III) oxide is use as starting material for the production of chromium metal and/or chromium-containing high-performance alloys. Here, it is generally possible to use only chromium(III) oxides which have a low sulphur content and a low carbon content. The term "low-sulphur chromium(III) oxide" is therefore frequently used as a synonym for "chromium(III) oxide for metallurgical purposes".

According to the prior art, chromium(III) oxide can be prepared by various processes. It is usually prepared at relatively high temperatures from hexavalent chromium compounds, with various purities being able to be achieved. Chromic acid, ammonium chromates or alkali metal chromates are used as starting compounds of hexavalent chromium. The reaction can be carried out with or without addition of a reducing agent. Reducing agents employed are organic or inorganic reducing agents such as wood shavings, molasses, cellulose waste liquors, acetylene, methane, sulphur and compounds thereof, phosphorus, carbon, hydrogen and the like. Such processes are described in numerous patents. Examples which may be mentioned are U.S. Pat. No. 1,893,761 and DE-A-20 30 510. U.S. Pat. No. 1,893,761 discloses the preparation of chromium(III) oxide by reduction of alkali metal chromates using organic substances. When carbon or organic compounds are used as reducing agent, the process can be carried out in such a way that sodium carbonate is ultimately obtained as by-product, as mentioned in U.S. Pat. No. 1,893,761. This may be attributed to sodium dichromate in the production process when the sodium dichromate is prepared via an oxidative alkaline fusion of chrome ore. Moreover, the chromium(III) oxide obtained in this way contains a high proportion of carbon which makes it unsuitable for metallurgical use. DE-A-20 30 510 describes a process for the continuous preparation of very pure, low-sulphur chromium(III) oxide by reduction of alkali metal chromates by means of hydrogen at relatively high temperatures and also an apparatus suitable for this purpose. The reaction temperature is 1000-1800° C., advantageously 1100-1400° C., and the product obtained is separated from the offgas by means of an alkaline dispersion. The processes described in DE-A-24 16 203 and U.S. Pat. No. 4,052,225 likewise use hydrogen for the reduction of alkali metal chromates. In both processes, the finely divided alkali metal chromate is reduced in a heated hydrogen-containing reaction zone at temperatures in the range from 900 to 1600° C., and the reduction can also be carried out in the presence of a gas which during the reduction of the alkali metal chromates binds the alkali metal ions to form salts and the chromium(III) oxide formed is precipitated in the form of an alkaline dispersion. As salt-forming gases, preference is given to using chlorine or hydrogen chloride, resulting in formation of sodium chloride. However, since the melting point of sodium chloride is 800° C., melting in the reactor is to be expected and will form lumps and cake material during relatively long campaigns.

A disadvantage of all these processes which employ a reducing agent is that the use of the reducing agent inevitably leads to formation of a by-product which has to be worked up.

The thermal decomposition of pure ammonium dichromate, on the other hand, leads to no significant inevitable formation of a by-product, since in the ideal case it proceeds according to the reaction equation

$$(NH_4)_2Cr_2O_7 \rightarrow Cr_2O_3 + N_2 + 4H_2O \qquad (1)$$

and at a temperature of about 200° C. upwards. Moreover, the industrial processes practised today for preparing ammonium dichromate starts out from alkali metal dichromates, usually sodium dichromate. Here, the sodium dichromate is reacted with ammonium chloride or ammonium sulphate to form ammonium dichromate and sodium chloride or ammonium dichromate and sodium sulphate. Chromium(III) oxide for metallurgical purposes was previously produced industrially by calcining a mixture of ammonia dichromate and sodium chloride, which had been obtained in virtually stoichiometrically equivalent amounts by in-situ reaction of sodium dichromate and ammonium chloride, in a furnace. The calcination temperature should be above 700° C. to ensure that the reaction mixture has a high chromium(III) oxide content; however, there is a risk of slag formation in the furnace at an excessively high temperature, and the temperature is therefore generally kept below 850° C.

The use of ammonium sulphate instead of ammonium chloride is frequently preferred since ammonium chloride frequently sublimes as $NH_3$ and HCl in the calcination because of its low sublimation temperature and can thus get into the exhaust air. For this reason, the use of arnmonium chloride no longer has any economic importance. The disadvantage of the use of ammonium sulphate is, however, that it introduces sulphur into the production process, even though a chromium(III) oxide having a very low sulphur content is desirable.

DE-A-26 35 086 (U.S. Pat. No. 4,235,862) discloses a process for preparing a low-sulphur chromium(III) oxide which is characterized by ignition of a mixture of alkali metal dichromate and ammonium sulphate at a calcination temperature of from 800 to 1100° C. and separation of the chromium(III) oxide formed from the alkali metal salt formed, with from 0.7 to 0.89 mol, preferably from 0.7 to 0.84 mol, of ammonium sulphate being used per mol of alkali metal chromate. The work-up of the chromium(III) oxide after ignition is carried out in a conventional way by washing out water-soluble salt and drying. Sulphur contents in the chromium(III) oxide of from 50 to 100 ppm can be achieved by this process. A disadvantage of this process is that in order to achieve low sulphur contents, the starting substances must not be mixed in a stoichiometric ratio and ammonium sulphate has to be used in a significantly substoichiomettic amount. This results in low conversions in the region of about 90% and it is necessary to employ a high ignition temperature. The alkali metal dichromate present as a result of the excess decomposes thermally to form alkali metal chromate, chromium(III) oxide and oxygen. Thus, the reaction forms not only large amounts of alkali metal sulphate (for example sodium sulphate) but also always alkali metal chromate (for example sodium chromate) which during the later washing goes into the mother liquor or washing liquid and then has to be separated off and optionally recirculated to the process. The mother liquor then also contains the alkali metal sulphate which is necessarily formed and this has to be purified in a complicated manner since it is always contaminated with alkali metal chromate. In addition, the conditions proposed for the preparation of low-sulphur chromium(III) oxide have been found to be difficult to carry out in practice since the sodium sulphate content of the reaction mixture leads, at the high temperatures required, to caking (melting point of sodium sulphate about 885° C.) and thus to malfunctions in the production process.

To prepare chromium(III) oxide having relatively low sulphur contents, U.S. Pat. No. 4,296,076 discloses a process in which, inter alia, sodium dichromate and ammonium chloride or sodium dichromate and ammonium sulphate are used. In contrast to DE-A-26 35 086, an essentially stoichiometric ratio is selected or, preferably, an excess of the ammonium compound is used. In a first reaction step, the starting compounds are converted into ammonium dichromate and sodium chloride or ammonium dichromate and sodium sulphate. In the examples disclosed, this reaction step takes place at from 400 to 800° C., followed by an aqueous work-up and then a second ignition process at a temperature above 1100° C. Sulphur contents in the chromium(III) oxide of less than 40 ppm are achieved by this process. However, this process results in formation of large amounts of sodium chloride or sodium sulphate, which have to be purified in a complicated manner. In addition, the use of the ammonium compounds mentioned, in particular ammonium chloride, is not unproblematic because they sublime very readily and can thus get into the exhaust air.

A further process for preparing high-quality chromium (III) oxide described in the prior art is disclosed in RU 2 258 039. Although ammonium dichromate, obtained by reaction of sodium dichromate with ammonium sulphate in an aqueous phase, is also used here for the preparation of chromium (III) oxide, the sodium sulphate necessarily formed in the reaction is separated off from the reaction mixture, so that a relatively pure, i.e. low-sulphur, ammonium dichromate is thermally decomposed to give chromium(III) oxide. Sodium sulphate is always obtained as by-product and has to be purified in a complicated manner since it is contaminated with Cr(VI).

The thermal decomposition of pure chromic acid (2) is described, inter alia, as a reaction in the literature (for example Ullmann's Encyclopedia of Industrial Chemistry, Vol. A7, page 87, VCH Verlag, 1986)

$$4CrO_3 \rightarrow 2Cr_2O_3 + 3O_2 \qquad (2)$$

In the case of chromic acid as starting material for the preparation of chromium(III) oxide, too, alkali metal chromates are generally reacted with sulphuric acid and/or hydrogensulphate-containing compounds to form alkali dichromates in a first step (3) and these are then converted by means of further sulphuric acid into chromic acid (4).

$$2Na_2CrO_4 + H_2SO_4 \rightarrow Na_2Cr_2O_7 + Na_2SO_4 + H_2O \qquad (3)$$

$$Na_2Cr_2O_7 + H_2SO_4 \rightarrow 2CrO_3 + Na_2SO_4 + H_2O \qquad (4)$$

Consequently, considerable amounts of alkali metal sulphates, for example sodium sulphate, are also formed as by-products in this process for preparing chromium(III) oxide. In the process mentioned, viz, the thermal decomposition of pure chromic acid starting out from sodium chromate, about 1.9 kg of sodium sulphate are formed per kilogram of chromium(III) oxide (combination of (3), (4) and (2)). The sodium sulphate is always contaminated with sodium chromate, so that it is of low quality and has to be purified in a complicated manner before marketing. In addition, chromic acid is a very strong oxidant and an extremely corrosive compound. It is correspondingly difficult to handle in industrial processes at elevated temperatures.

Other processes in which largely sulphur- and carbon-free starting materials are used have also been described for preparing low-sulphur chromium(III) oxide.

In DE-A-28 52 198 (U.S. Pat. No. 4,230,677), ammonium monochromate is prepared by conversion of sodium dichrotnate or sodium monochromate by means of solvent extraction from an organic solvent. The subsequent calcination to form chromium(III) oxide is carried out at 500° C. This method has the disadvantage that it employs very highly dilute aqueous solutions. Thus, the concentration of chromium, calculated as $Cr_2O_3$, in the aqueous solution to be extracted is in the range from 1 g/l to 25 g/l, with 8.2 g/l being indicated as particularly preferred concentration. In the organic phase, too, a $Cr_2O_3$ concentration of only 10 g/l can be achieved after two extraction stages. As a result, very large quantities of liquid have to be handled, worked up again and circulated. Benzene, xylene or toluene alone or mixed with an isoparaffinic hydrocarbon are used as organic solvents. All these materials are hazardous materials which are readily flammable, so that comprehensive measures for the protection of employees and the environment have to be undertaken when carrying out this process. Furthermore, the extraction takes place at a pH in the range from 1 to 2, for which purpose hydrochloric acid is used. This results in a not inconsiderable amount of sodium chloride which pollutes the wastewater. The organic solvents Used all have an appreciable solubility in water (solubilities at 20° C. in water:benzene 1.77 g/l, toluene 0.47 g/l, xylene 0.2 g/l), so that the wastewater additionally carries a high freight of organic compounds and has to be purified in a complicated manner. Due to its numerous disadvantages, this process has hitherto not attained any economic importance.

Even without the presence of a reducing agent, the thermal treatment of sodium dichromate at elevated temperatures leads to chromium(III) oxide. Thus, according to the studies of S. Sampath et al. (Thermochimica Acta, 159 (1990), pp. 327-335), $Na_2Cr_2O_7 \cdot 2H_2O$ slowly decomposes, at a temperature of 500° C. and above, to $Na_2CrO_4$ and $Cr_2O_3$.

$$4Na_2Cr_2O_7 \cdot 2H_2O \rightarrow 4Na_2CrO_4 + 2Cr_2O_3 + 3O_2 + 8H_2O \qquad (5)$$

According to the chemical reaction equation, a maximum of 50 mol % of the Cr(VI) used are converted into chromium (III) oxide in the ideal case. During the heating procedure, the transition of sodium dichromate containing water of crystallization to the anhydrous compound firstly occurs at 83° C. The sodium dichromate which is free of water of crystallization melts at 357° C., so that the decomposition takes place in the melt. This results in another significant decrease in the conversion in the reaction. The reaction rate at 500° C. is still very low, so that higher temperatures have to be employed in order to achieve acceptable reaction rates. Thus, for example, only about 25 mol % of Cr(VI) is converted into $Cr_2O_3$ in the decomposition of anhydrous sodium dichromate at 750° C. The low yield makes this process for preparing chromium(III) oxide uninteresting on an industrial scale.

In CN-A-1310132 ammonium chromate is prepared by reaction of sodium chromate in the presence of carbon dioxide and ammonia. The ammonium chromate prepared by this process is said to be able to be used for the preparation of chromium(III) oxide. However, the process disclosed for the preparation of ammonium chromate has a number of disadvantages. Firstly, the sodium chromate solution used has to be recrystallized and filtered at the beginning. Thus, an only incompletely described purification step in which sodium chloride is obtained as by-product is necessary. Secondly, the reaction with carbon dioxide and ammonia proceeds in two process steps in each of which carbon dioxide and ammonia are added. The sodium hydrogencarbonate formed in the first reaction is separated off by cooling crystallization, with the cooling rate being from 1° C./h to 4° C./h. The crystallization is therefore a very slow and time-consuming process, especially since a two-hour ageing step also takes place before the filtration in all examples disclosed. The conditions under which chromium (III) oxide is to be prepared from the ammonium chromate obtained are not disclosed in CN-A-1310132.

The use of pure ammonium chromate or ammonium dichromate for the thermal decomposition to produce pure chromium(III) oxide is generally not uncritical since the decomposition in the dry state can occur in an explosive manner. Ammonium dichromate is therefore also classified as a hazardous material with the hazard symbol "E" (explosive). The decomposition reaction is therefore difficult to control. The $Cr_2O_3$ decomposition product obtained from this reaction has an extremely low bulk density which can be in the range from 0.1 to 0.2 $g/cm^3$. As a result, the $Cr_2O_3$ decomposition product obtained has a very strong tendency to produce dust. In an industrial process, the exhaust air has to be freed of a large amount of dust. The dust additionally contains amounts of unreacted Cr(VI).

CN-A-1418822 discloses the simultaneous preparation of alkali metal dichromates and chromium(III) oxide, which is characterized in that an alkali metal chromate is mixed with ammonium chromate or ammonium dichromate in a molar ratio of alkali metal: chromate:ammonium chromate or ammonium dichromate=(0.3-3):1 and the mixture is ignited in the temperature range from 650° C. to 1200° C. for from 0.5 to 3 hours. The ignited product is dissolved in water. After solid/liquid separation, the solid residue consists of low-sulphur chromium(II) oxide. Alkali metal dichromate is crystallized from the concentrated mother liquor by cooling. The solid alkali metal dichromate is separated from unreacted alkali metal chromate by solid/liquid separation. In the examples disclosed, mixtures of sodium chromate ($Na_2CrO_4 \cdot 4H_2O$) and ammonium chromate, sodium chromate ($Na_2CrO_4$) and ammonium dichromate, potassium chromate ($K_2CrO_4$) and ammonium chromate or potassium chromate ($K_2CrO_4$) and ammonium dichromate are used. The yield of chromium(III) oxide based on the Cr(VI) present in the starting mixtures ranges from 36 to 40% in Examples 1 to 3. In addition, the reaction product as is obtained, for example, from Examples 1 and 2 is very sticky. This makes industrial implementation in, for example, a rotary tube furnace very difficult.

It is known from CN 1418821 that sulphur-free chromium oxide can be obtained from a 1:1 ammonium chromate-alkali metal double salt by calcination at 650-1200° C. However, the process described there has the disadvantage that the yield of chromium oxide is only about 23% based on the Cr(VI) present in the starting product and the process thus does not represent an economical method of obtaining chromium oxide. A further disadvantage is that the proportion of Na, calculated as Na metal, in the chromium oxide obtained is 1900 ppm and therefore very high. In addition, the reaction mixture is found to be very sticky at or above a temperature of about 700° C., at which the calcination takes place, and, in particular, technical implementation in, for example, a rotary tube furnace is therefore very difficult.

GB 748,610 describes, in general terms, the reduction of alkali metal chromates by means of hydrogen and subsequent conversion into $Cr_2O_3$. The yields in such a reduction are, however, very low. Thus, the yield of $Cr_2O_3$ starting from alkali-free sodium monochromate is less than 67%, which makes this process uninteresting for the reaction using such reactive starting materials on an industrial scale.

CN 1907865A discloses a process for preparing chromium oxide, in which a chromate salt as starting material and a reducing gas such as hydrogen, natural gas, coal gas or mixtures thereof as reducing agent are allowed to react at 300-850° C. for from 0.5 to 3 hours. After cooling, the reaction mixture is washed with water and, after drying at 400-1100° C., calcined for from 1 to 3 hours. The process described in CN 1907865A, in particular Example 1, starting from chromate and hydrogen is therefore equivalent to the process disclosed in GB 748,610; reworking this example under the conditions specified led neither to evolution of heat nor to a measurable reaction.

In CN-101475217, the preparation of pigment-grade chromium oxide is carried out by reaction of sodium dichromate with ammonia at 350° C., subsequent hydrolysis, isolation of the intermediate and subsequent calcination in the presence of oxidic additives at 1100° C. However, the yield of chromium oxide obtained by this process, with corresponding oxidic by-products, is less than 45% and therefore very low and thus industrially uninteresting (cf. Comparative Example 2).

As early as 1957, Polyak and Devyatovskaya describe laboratory experiments on the reaction of sodium monochromate and sodium dichromate with gaseous ammonia (Trudy Ural. Nauch.-Issledovatel Khim. Inst. 4, 1957, pages 30-32). According to their studies, sodium monochromate and sodium dichromate can be reduced by gaseous ammonia to form sodium chromite $NaCrO_2$ only at temperatures of 700° C. and above. The hydrolysis of the sodium chromite is described as being very difficult and a further work-up to give chromium oxide is not mentioned by the authors.

It was an object of the invention to discover a process for preparing chromium oxide, which can be more readily utilized economically and, in addition, produces a chromium oxide which can be used for metallurgical purposes, i.e., in particular, a chromium oxide which has a low sulphur content and alkali metal content, in particular sodium content, and has a very small content of by-products.

It has surprisingly been found that gaseous ammonia can be used as reactant for alkali metal chromates and chromium (III) oxide can in this way be prepared via alkali metal chromite. The invention therefore provides a process for preparing chromium(III) oxide, which comprises the steps:

a) reaction of alkali metal chromate with gaseous ammonia, in particular at a temperature of from 200 to 800° C., b) hydrolysis of the reaction product obtained in step a) with the pH of the water for the hydrolysis being reduced before the hydrolysis and/or preferably or that of the alkaline mother liquor being reduced during or after the hydrolysis, to a value of from 4 to 11, preferably from 5 to 10, by means of an acid, c) isolation of the hydrolysis product which has precipitated in step b), preferably at a pH of from 4 to 11, in particular from 5 to 10, and optionally washing and optionally drying and d) calcination of the hydrolysis product obtained in step c) at a temperature of from 700 to 1400° C., in particular from 800 to 1300° C.

Step a)

As starting material for the preparation of chromium(III) oxide, it is possible to use all alkali metal chromates. It is inconsequential whether the alkali metal chromates are used as monochromates, dichromates, trichromates and so forth or as polychromates. Furthermore, it is inconsequential whether the alkali metal chromates are used as anhydrous compounds or in the form of their hydrates. The alkali metal chromate is preferably sodium dichromate, sodium dichromate dihydrate or potassium dichromate, particularly preferably sodium dichromate and sodium dichromate dihydrate. For the purposes of the present invention, the term "alkali metal chromates" also encompasses the group of alkali metal chromichromates in which chromium is present not only in the oxidation state +VI (in the form of chromate) but simultaneously also in the oxidation state +III. An example of such an alkali metal chromichromate is $NaCr_3O$, which can also be described by the formula $NaCr(CrO_4)_2$. The alkali metal chromate can be used either as a solution, in particular as an aqueous solution, or as a suspension or as a solid. In the process of the invention, particular preference is given to using solids which preferably have a residual moisture content of less than 4.0% by weight, particularly preferably less than 2.0% by weight. Likewise, the alkali metal chromate used preferably has a content of alkali metal hydroxide of less than 2% by weight, particularly preferably less than 1% by weight, in particular less than 0.5% by weight.

The alkali metal chromate used in step a) does not necessarily have to be used in pure form. It can also advantageously be used in the form of a mixture. Thus, for example, mixtures of alkali metal monochromates and chromium(III) oxide are particularly advantageous. Such mixtures can be synthesized by mixing of the two components, but they can also be prepared by means of a solid-state reaction starting out from alkali metal chromite and alkali metal dichromate. Preferred mixtures contain alkali metal monochromates and chromium(III) oxide in a ratio of, for example, from 99:1 to 1:99, preferably from 90:10 to 10:90, particularly preferably from 40:60 to 60:40, based on the chromium(III) and chromium(VI) present in the compounds, or are obtained in the abovementioned ratios by means of a solid-state reaction. The solid-state reaction between alkali metal chromite and alkali metal bichromate preferably takes place at a temperature above 300° C., preferably at from 300° C. to 500° C.

The reaction of the alkali metal chromate with gaseous ammonia is preferably carried out at a temperature of from 200 to 800° C., particularly preferably from 200 to 600° C., very particularly preferably from 200 to 500° C. The reaction does not necessarily have to occur at only one temperature. It has been found to be advantageous to increase the temperature during the course of the reaction. The reaction is preferably started at a temperature of from 200 to 300° C. and this temperature is maintained until a temperature rise can be observed. The temperature can then be increased for the further reaction, with this increase being able to be carried out continuously or stepwise.

The reaction of the alkali metal chromate with gaseous ammonia is preferably carried out in an indirectly heated reactor, in particular in a rotary tube furnace or in a fluidized bed.

The reaction time is generally from 0.5 to 10 hours and depends, inter alia, on the reaction temperature, the alkali metal chromate used and the size of the alkali metal chromate crystals used. For this reason, it can be advantageous to comminute the alkali metal chromate used before it is introduced into step a). Preference is given to particles smaller than 1000 μm, particularly preferably smaller than 500 μm, very particularly preferably smaller than 300 μm.

The reaction of the alkali metal chromate with gaseous ammonia leads to formation of an intermediate which at the prevailing temperatures ultimately gives an alkali metal chromite salt as reaction product. As will be shown for the example of the reaction of sodium dichromate with gaseous ammonia, the overall reaction can be assumed to be as follows:

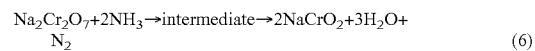

$$Na_2Cr_2O_7 + 2NH_3 \rightarrow \text{intermediate} \rightarrow 2NaCrO_2 + 3H_2O + N_2 \quad (6)$$

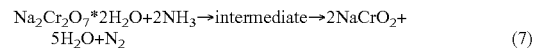

$$Na_2Cr_2O_7 \cdot 2H_2O + 2NH_3 \rightarrow \text{intermediate} \rightarrow 2NaCrO_2 + 5H_2O + N_2 \quad (7)$$

The intermediate can be detected indirectly by means of the temperature curve observed in the reaction, about 50 minutes after ammonia is introduced at an internal reactor temperature of 220° C., the temperature rises suddenly without increased introduction of heat from the outside to about 370° C. The sodium chromite $NaCrO_2$ formed was able to be detected in the reaction product by means of an X-ray diffraction pattern recorded on one of the examples described below.

To ensure a very complete conversion in the reaction, the gaseous ammonia is advantageously used not in the precise stoichiometric ratio as indicated in the two equations (6) and (7) but in excess. The ammonia excess is preferably at least 5%, particularly preferably at least 10%, in particular from 10 to 30%, based on the stoichiometric amount.

The reaction in step a) is preferably ended only when the reaction product gives a suspension having a pH of at least 11, particularly preferably at least 12, very particularly preferably at least 13, on hydrolysis using a four-fold amount of water. To determine the preferred end of the reaction, preference is given to taking samples from the reaction, subjecting them to hydrolysis by means of water as described and determining the pH of the suspension obtained.

The reaction product obtained from step a) can be comminuted before being introduced into step b) so as to ensure very rapid and complete hydrolysis.

Step b)

The reaction product obtained in step a) is hydrolyzed by means of water to form a precipitate and a mother liquor.

The hydrolysis can be carried out at room temperature or at elevated temperatures. The hydrolysis forms chromium (III) hydroxide and/or chromium(III) oxide hydroxide as precipitate and an alkali solution, so that the mother liquor formed has a very high pH when pure water is used. The hydrolysis of, for example, sodium chromite $NaCrO_2$ can formally be described by the following two reaction equations:

$$NaCrO_2 + 2H_2O \rightarrow Cr(OH)_3 + NaOH \quad (8)$$

$$NaCrO_2 + H_2O \rightarrow CrO(OH) + NaOH \quad (9)$$

The hydrolysis product precipitated here is X-ray amorphous, so that its precise structure has not yet been able to be elucidated. Based on the reaction product obtained from step a), at least the same weight of water is preferably used for the hydrolysis. However, since the viscosity of the suspension obtained can be very high, it is advantageous to use at least twice the weight of water, based on the reaction product obtained from step a), for the hydrolysis. Regardless of the precise structure and composition, the hydrolysis product is suspended in a very alkaline mother liquor when pure water is used. In addition, the hydrolysis product is generally very finely divided, so that the solid/liquid separation can sometimes be difficult and very time-consuming. The filtration properties and also the product quality (purity, in particular Na content) of the chromium(III) oxide ultimately obtained and also the yield thereof have been able to be improved in the process of the invention. The lowering of the pH is preferably carried out at a temperature of from 20 to 100° C., more preferably from 40 to 100° C. The lowering of the pH is very particularly preferably carried out during or after the hydrolysis. In an alternative embodiment, the water which is used for the hydrolysis can already have a reduced pH which is preferably selected so that a pH of from 4 to 11, preferably from 5 to 10, results after hydrolysis. A pH reduction is very particularly preferably carried out before the isolation of the precipitated hydrolysis product which takes place in step c). Preference is given to using inorganic acids or organic acids to reduce the pH. Inorganic acids for the purposes of the present invention encompass gases which have an acidic reaction in water, for example carbon dioxide. These gases having an acidic reaction can be passed into the mother liquor either under atmospheric pressure or under superatmospheric pressure. Particular preference is given to using organic acids, in particular organic low molecular weight acids such as formic acid or acetic acid. These organic acids have the advantage that, if residues should remain on the hydrolysis product and not be able to be removed during the washing in step c), they are decomposed by oxidation without leaving a residue in the later calcination in step d) and do not remain as impurity in the calcined product.

Very particular preference is given to using carbon dioxide for setting the pH, and this can be introduced into the mother liquor either under atmospheric pressure or under superatmospheric pressure. The pH after it has been set is preferably in the range from 4 to 11, particularly preferably in the range from 5 to 10. The setting of the pH can be carried out in one or more steps.

The advantage of using $CO_2$ for setting the pH is that in this way sodium carbonate or sodium hydrogen carbonate can be obtained from the alkaline mother liquor. The sodium carbonate or the sodium hydrogencarbonate can be separated off by various continuous or discontinuous solid/liquid separation processes. Among continuously operating apparatuses, particular preference is given to, for example, vacuum drum filters or vacuum belt filters or centrifuges. Sodium carbonate can be reused directly for the preparation of alkali metal chromates or dichromates by oxidative fusion of chrome-iron ore. In the case of sodium hydrogencarbonate, this can be converted by ignition into sodium carbonate and then used for the preparation of alkali metal chromates or dichromates by oxidative fusion of chrome-iron ore. The carbon dioxide liberated in the ignition of sodium hydrogencarbonate to form sodium carbonate can be recirculated to the process for the purpose of reducing the pH.

Step c)

The precipitated Cr-containing hydrolysis product obtained from step b) is then separated off from the mother liquor. A person skilled in the art will know a number of suitable apparatuses and processes for the solid/liquid separation. It is inconsequential whether the solid/liquid separation and any washing following it are carried out continuously or batchwise. Likewise, it is inconsequential whether they are carried out under superatmospheric or subatmospheric pressure.

Among the continuously operating filtration and washing apparatuses, particular preference is given to, for example, vacuum drum filters or vacuum belt filters. Among the discontinuously operating filtration and washing apparatuses, particular preference is given to filter presses.

The hydrolysis product which has been separated off, preferably filtered off, can then be washed or, optionally after drying, passed to step d). A person skilled in the art will know of a number of suitable apparatuses for the drying step. Mention may at this point be made of channel, belt, rack, roller, drum, tube, paddle, spray dryers (atomization dryers having discs or nozzles), fluidized-bed dryers or discontinuously operating chamber-tray dryers. The moist filter cake is preferably fed directly to the calcination step d), in particular without washing.

The hydrolysis product which has been separated off can also be washed in one or more stages. Washing can be carried out directly using water. To improve the washing and filtration properties of the solid obtained, it can be advantageous to reduce the pH of the washing water. The washing water is preferably mixed with an acid before or during washing in order to reduce the pH. Inorganic acids or organic acids or carbon dioxide, as described above, are preferably used for this purpose. Particular preference is given to using organic acids, in particular organic low molecular weight acids such as formic acid or acetic acid. Very particular preference is given to using carbon dioxide for setting the pH, and this can be introduced into the washing water either under atmospheric pressure or under superatmospheric pressure. The pH of the washing water after washing is preferably in the range from 4 to 11, particularly preferably in the range from 5 to 10. The setting of the pH can be carried out in one or more steps.

It can be advantageous to use flocculants or flocculation auxiliaries before filtration or before washing. The use of organic flocculants or flocculation auxiliaries is particularly preferred because they are decomposed by oxidation without leaving a residue in the later calcination in step d) and do not remain as impurity in the calcined product. Preferred flocculants are anionic polyelectrolytes, for example polyelectrolytes based on polyacrylate, polyacrylamide, polyethylenimine and polyethylene oxide of various chain lengths. In addition, it is also possible to use nonionic synthetic and natural (for example starch or glue) compounds as flocculation auxiliaries.

The moist filter cake of the hydrolysis product obtained after isolation and optionally washing can be passed either directly to the calcination in step d) or can be dried beforehand. A person skilled in the art will know a number of suitable apparatuses which have been mentioned above for the drying step.

When carbon dioxide is likewise used for reducing the pH during washing, the washing water obtained in step c) can likewise be used for recovering sodium carbonate or sodium hydrogencarbonate, as described above for step b). It is naturally also possible to combine the mother liquor from step b) and the washing water from step c) and use them together, optionally after concentration, for the recovery of sodium carbonate or sodium hydrogencarbonate. It is also possible in principle to concentrate each of the two substreams separately from one another before they are combined and use the combined stream for the recovery of sodium carbonate or sodium hydrogencarbonate. However, this procedure incurs the risk that sodium hydrocarbonate may crystallize out from the mother liquor if it is concentrated too much, since the mother liquor always has a very high sodium concentration.

Step d)

The thermal treatment at elevated temperature, i.e. the calcination, in step d) is carried out at a temperature of from 700 to 1400° C., particularly preferably from 800 to 1300° C., preferably for a period of more than 20 minutes, particularly preferably more than 30 minutes, in particular from 30 minutes to 4 hours. A person skilled in the art will know a number of suitable apparatuses for calcination at such high temperatures. Mention may at this point be made of annular hearth furnaces, rotary tube furnaces, fluidized-bed reactors or discontinuously operating chamber furnaces. The calcination is preferably carried out in a directly heated rotary tube furnace. The residence time of the material to be calcined is, depending on the configuration and length of the furnace, preferably from 30 minutes to 4 hours. The calcination is preferably carried out in air or in an atmosphere of pure oxygen or in an atmosphere of air enriched with oxygen.

The optionally washed hydrolysis product which is obtained from step c) and is calcined in step d) does not tend to stick during the calcination, so that the calcination can be carried out without problems.

In a particularly preferred variant of the process of the invention, one or more alkali metal halides or ammonium halides or alkaline earth metal halides, in particular the fluorides, chlorides, bromides or iodides of sodium or potassium or ammonium, or alkali metal hydroxides, in particular sodium hydroxide or potassium hydroxide, or chromic acid are added in an amount of from 0.01% by weight to 3.0% by weight, particularly preferably from 0.02% by weight to 1.0% by weight, based on the hydrolysis product used for the calcinations, before the calcination. The use properties, in particular the increase in the bulk density of the chromium (III) oxide obtained, can be influenced by such additions. However, addition of such additives during calcination is preferably dispensed with.

The chromium(III) oxide obtained after the calcination in step d) is preferably cooled and optionally milled. In a particularly preferred variant of the process of the invention, the calcined product from step d) is suspended in water to form a mother liquor and is optionally washed again with water in one or more stages and is subsequently dried again. In this way, water-soluble impurities (water-soluble salts), essentially alkali metal chromate, for example sodium chromate, which has been formed by oxidation of chromium(III) oxide at high temperatures, which are still present in the chromium(III) oxide can be washed out by known methods in one or more stages using water or aqueous media and the solid can be separated off from the liquid. The preferred embodiments for washing as indicated above for step c) apply.

The chromium(III) oxide generally has good filtration and washing properties, so that adjustment of the pH or addition of a flocculant or flocculation auxiliary is no longer necessary. The moist chromium(III) oxide obtained after solid/liquid separation is subsequently dried. The dried chromium (III) oxide is then preferably packaged directly or optionally milled again before packaging.

The apparatuses mentioned above can be used for drying. Depending on the drying apparatus selected, it may be necessary for a milling step to follow. However, even when no leaching, washing and drying of the calcined product has been carried out, milling can be advantageous. The calcined product which has optionally been suspended in water and washed and dried is preferably subjected to further milling. Milling apparatuses of various designs, for example roller mills, pan mills, reciprocating mills, hammer mills, pin mills, turbomills, ball mills or jet mills, are suitable for this purpose. When the calcined product has been washed, it is particularly advantageous to use a mill-dryer in which drying and milling are carried out in only one operation. The choice of the suitable milling apparatus depends, inter alia, on the respective field of use for the chromium(III) oxide prepared.

When the calcined chromium(III) oxide is washed, the respective mother liquor and the washing water in both cases contain essentially alkali metal chromate and/or alkali metal dichromate. These two materials can be recirculated to the production process by, for example, using them again for the preparation of alkali metal dichromate or, for example, an alkali metal-ammonium chromate double salt. Mother liquors and washing water which are obtained in the washing of the calcined product are particularly preferably used again for the preparation of alkali metal dichromate or, for example, an alkali metal-ammonium chromate double salt.

The chromium(III) oxide prepared by the process of the invention is highly pure. It is consequently highly suitable for metallurgical purposes such as the production of chromium Metal or chromium-containing high-performance alloys, in particular by reduction in the presence of aluminium metal by the alunainothennic process, and for the production of high-temperature-resistant materials, but can also be used as colour pigment for pigment applications since it also has a low content of water-soluble salts.

The invention also encompasses the use of the chromium (III) oxide prepared by the process of the invention as colour pigment, abrasive and as starting material for the production of high-temperature-resistant materials, chromium metal or chromium-containing high-performance alloys, in particular by reduction in the presence of aluminium metal by the aluminothermic process.

The process of the invention for preparing high-purity, low-sulphur chromium(III) oxide has some significant advantages over the processes described in the prior art. One advantage of the process of the invention is that alkali metal chromate and/or alkali metal dichromate are formed as by-products and can be recirculated to the production process without problems. The strongly alkaline mother liquor formed in the hydrolysis can be acidified by means of carbon dioxide and in this way either be converted directly into sodium carbonate or firstly be converted into sodium hydrogencarbonate which is then calcined to give sodium carbonate. The sodium carbonate can be reused for the oxidative fusion of chrome-iron ore to form sodium chromate. A great advantage over the process described in CN 1907865A is that the yield is improved and, particularly in the case of the pH being reduced, the yield and purity of the chromium oxide obtained can be increased further. At the same time, it is possible to reduce the Na content in the hydrolysis product, which is found to be advantageous in the subsequent calcination because at a lower Na content less Cr(III) is oxidized to chromate and converted into sodium chromate. The process of the invention therefore gives significantly higher yields of chromium(III) oxide. The chromium (III) oxide obtained by the process of the invention is highly pure. It is per se low in sulphur because no sulphur compounds are introduced into the production process. Furthermore, it is low in alkali metals. For the purposes of the present invention, the term "low-sulphur" refers to chromium(III) oxides which have a sulphur content of less than 200 ppm, preferably less than 50 ppm, very particularly preferably less than 40 ppm. For the purposes of the present invention, the term "low in alkali metals" refers to chromium(III) oxides which have an alkali metal content, calculated as alkali metal, of less than 1500 ppm, preferably less than 500 ppm.

The invention is illustrated by the following examples without the invention being restricted thereby.

EXAMPLES

Example 1

60 g of anhydrous, comminuted sodium dichromate $Na_2Cr_2O_7$ were introduced into a glass container provided with gas inlet and outlet with a glass frit. The bottom was completely covered and the temperature sensor dipped into the loose material. The glass container was introduced into a regulated furnace. The glass container was heated under nitrogen to a wall temperature of 300° C. At an internal temperature of 220° C., the stream of nitrogen was replaced by a moderate stream of ammonia which flowed through the product from the bottom. After 50 minutes, the internal temperature rose within a few minutes from 220° C. to 371° C. as a result of the exothermic reaction. After 60 minutes, the wall temperature was increased to 400° C. over 10 minutes to complete the reaction. After a further 6.5 hours, the ammonia was again displaced by nitrogen and the apparatus was cooled to room temperature. 50.3 g of reaction product were obtained.

The coarsely comminuted reaction product was slurried in 200 ml of water and hydrolyzed. The strongly alkaline suspension was brought to a pH of 6 by means of acetic acid, subsequently filtered on a suction filter and the filter cake was dried at 120° C. without further washing. It was then ignited at 1250° C. for 2 hours. The ignited chromium(III) oxide was again suspended in water, washed with water and subsequently dried at 120° C.

The chromium(III) oxide obtained in this way had an Na content, calculated as Na metal, of 210 ppm. The yield of chromium(III) oxide was 92% based on the chromium present in the starting material $Na_2Cr_2O_7$.

Example 2

The reaction of 60 g of comminuted sodium dichromate $Na_2Cr_2O_7$ with gaseous ammonia was carried out as described in Example 1.

The comminuted reaction product was slurried in 200 ml of water and hydrolyzed, giving a suspension having a pH of 14. Carbon dioxide was then passed under atmospheric pressure into the suspension until a pH of 9.4 was obtained and could no longer be reduced further. The suspension was then briefly heated to 95° C. and filtered on a suction filter. The filter cake was resuspended in 200 ml of water and the pH of the suspension was set to 7.7 by introduction of carbon dioxide under atmospheric pressure. A further lowering of the pH was not possible. The suspension was then once again briefly heated to 95° C. and filtered on a suction filter. The filter cake was resuspended in 200 ml of water and the pH of the suspension was set to 6.8 by introduction of carbon dioxide under atmospheric pressure. Further lowering of the pH was not possible. The suspension was then briefly heated to 95° C. and filtered on a suction filter. The filter cake was dried at 120° C. It was subsequently ignited at 1250° C. for 2 hours. The ignited chromium(III) oxide was again suspended in water, washed with water and finally dried at 120° C.

The chromium(III) oxide obtained in this way had an Na content, calculated as Na metal, of 130 ppm. The Cr content indicated a purity of 98.9%. The yield of chromium(III) oxide was 91% based on the chromium present in the starting material $Na_2Cr_2O_7$.

Example 3

The reaction of 60 g of comminuted sodium dichromate $Na_2Cr_2O_7$ with gaseous ammonia was carried out as described in Example 1.

The reaction product which had been comminuted to a particle size of less than 600 μm was slurried in 200 ml of water and hydrolyzed. 2.0 g of a 0.1% strength aqueous solution of a flocculation auxiliary (copolymer of acrylamide and sodium acrylate) were then added. Carbon dioxide was then passed in under atmospheric pressure at room temperature while stirring until a pH of 9.9 had been established. A further lowering of the pH was not possible. The suspension was then briefly boiled and filtered on a suction filter. The filter cake was resuspended in 200 ml of water, 2.0 g of the abovementioned 0.1% strength aqueous solution of the flocculation auxiliary were added and the pH of the suspension was set to 7.4 by introduction of carbon dioxide under atmospheric pressure. The suspension was then again briefly boiled and filtered on a suction filter. The filter cake was resuspended in 200 ml of water, 2.0 g of the abovementioned 0.1% strength aqueous solution of the flocculation auxiliary was added and the pH of the suspension was set to 6.5 by introduction of carbon dioxide under atmospheric pressure. The suspension was then again briefly boiled and filtered on a suction filter. The filter cake was dried at 120° C. It was subsequently ignited at 1250° C. for 2 hours. The ignited chromium(III) oxide was again suspended in water, washed with water and finally dried at 120° C.

The chromium(III) oxide obtained in this way had an Na content, calculated as Na metal, of 310 ppm. The Cr content indicates a purity of 99.7%. The yield of chromium(III) oxide was 96% based on the chromium present in the starting material $Na_2Cr_2O_7$.

Example 4

Comminuted sodium chromite $NaCrO_2$ and comminuted sodium dichromate $Na_2Cr_2O_7$ are mixed in a molar Cr(III):Cr(VI) ratio of 1:1 and heated to 350° C. under an inert gas atmosphere. After one hour, the temperature is increased at 3° C./min to 450° C. and maintained at 450° C. for 30 minutes. The reaction product obtained is dark green. According to an X-ray powder diffraction pattern, it consists of chromium(III) oxide and sodium monochromate $Na_2CrO_4$:

$$2NaCrO_2 + Na_2Cr_2O_7 \rightarrow 2Na_2CrO_4 + Cr_2O_3 \qquad (10)$$

The reaction product was reacted at 500° C. with gaseous ammonia which was used as a mixture containing 13.6% by volume of ammonia and an inert gas, with the reduction commencing from about 350° C. A weight loss of 10.65% occurs during the reduction, which is in good agreement with the expected reaction to form sodium chromite:

$$2Na_2CrO_4+Cr_2O_3+2NH_3 \rightarrow 4NaCrO_2+3H_2O+N_2 \quad (11)$$

The sodium chromite $NaCrO_2$ obtained after the reaction with ammonia according to equation (11) can be worked up as described in Examples 1 to 3.

Comparative Example 1 (without Lowering of the pH During the Hydrolysis)

The reaction of 60 g of comminuted sodium dichromate $Na_2Cr_2O_7$ with gaseous ammonia was carried out as described in Example 1.

The comminuted reaction product was slurried in 100 ml of water and hydrolyzed, giving an alkaline suspension. This was then filtered on a suction filter and the filter cake was resuspended in 100 ml of water for 1 hour and again filtered on a suction filter. The filter cake was dried at 120° C. and subsequently ignited at 1250° C. for 2 hours. The ignited chromium(III) oxide was again suspended in water, washed with water and finally dried at 120° C.

The chromium(III) oxide obtained in this way had an Na content, calculated as Na metal, of 540 ppm. The yield of chromium(III) oxide was 65%, based on the chromium present in the starting material $Na_2Cr_2O_7$.

Comparative Example 2 (in Accordance with CN-101475217 without Lowering of the pH During the Hydrolysis)

Sodium dichromate $Na_2Cr_2O_7$ was, as described in CN-101475217, reacted with gaseous ammonia at 350° C. for 1 hour. The reaction product obtained was cooled and washed three times at 80° C. with the indicated amount of water. After filtration, the solid had a moisture content of 29% and was mixed with 2% by weight of an equimolar mixture of $P_2O_3$, $Al_2O_3$, ZnO, $Sb_2O_3$, BaO and $TiO_2$ and ignited at 1100° C. for 1 hour. The product was subsequently again washed, dried and comminuted a number of times. The yield of chromium(III) oxide was 44.6%, based on the chromium present in the starting material $Na_2Cr_2O_7$.

Comparative Example 3 (Based on CN-101475217 Without Lowering of the pH During the Hydrolysis)

Sodium dichromate $Na_2Cr_2O_7$ was reacted with gaseous ammonia as described in Example 1. The reaction product obtained was cooled and then, in accordance with CN-101475217 worked up further and reacted as described in Comparative Example 2. The yield of chromium(III) oxide was 65%, based on the chromium present in the starting material $Na_2Cr_2O_7$.

What is claimed is:

1. A process for preparing chromium(III) oxide, the process comprising:
   a) reacting an alkali metal chromate with gaseous ammonia at a temperature of 200 to 600° C., thereby forming a reaction product,
   b) hydrolysing the reaction product, wherein the hydrolysing comprises one of:
      reducing the pH of water used for the hydrolysing before hydrolysing, or
      reducing the pH of a resultant alkaline mother liquor during or after hydrolysing,
   to a pH value of from 4 to 11, by adding an acid to the water or resultant mother liquor, whereby a hydrolysis product is formed,
   c) isolating the hydrolysis product formed in step b), and
   d) calcinating the hydrolysis product of step c) at a temperature of 700 to 1400° C. to produce a calcined chromium(III) oxide product.

2. The process according to claim 1, wherein reacting the alkali metal chromate with gaseous ammonia comprises reacting the alkali metal chromate with gaseous ammonia in an indirectly heated reactor.

3. The process according to claim 1, wherein the alkali metal chromate is sodium dichromate, sodium dichromate dihydrate or potassium dichromate.

4. The process according to claim 1, wherein the acid is an inorganic acid or an organic acid.

5. The process according to claim 1, further comprising:
   suspending the calcined product obtained from step d) in water, and
   subsequently drying the calcined product.

6. The process according to claim 1, further comprising:
   suspending the calcined product obtained from step d) in water,
   washing the calcined product with water one or more times,
   subsequently drying the calcined product, and
   thereafter milling the calcined product.

7. The process according to claim 1, further comprising adding before calcinating, in an amount of 0.01% by weight to 3.0% by weight, based on a product used for the calcinating, a compound selected from the group consisting of alkali metal halides, ammonium halides, alkaline earth metal halides, fluorides, chlorides, bromides, iodides of sodium or potassium or ammonium, alkali metal hydroxides, sodium hydroxide, potassium hydroxide, and chromic acid.

8. The process according to claim 1, wherein hydrolyzing the reaction product comprises reducing the pH to a pH value of 5 to 10.

9. The process according to claim 1, wherein calcining the hydrolysis product comprises calcinating the hydrolysis product at a temperature of 800 to 1300° C.

10. The process according to claim 1, wherein reacting the alkali metal chromate with gaseous ammonia comprises reacting the alkali metal chromate with gaseous ammonia in a rotary tube furnace or in a fluidized bed.

11. The process according to claim 1, wherein the acid is carbon dioxide.

12. The process according to claim 1, further comprising adding before calcinating, in an amount of 0.02% by weight to 1.0% by weight, based on a product used for the calcinating, a compound selected from the group consisting of alkali metal halides, ammonium halides, alkaline earth metal halides, fluorides, chlorides, bromides, iodides of sodium or potassium or ammonium, alkali metal hydroxides, sodium hydroxide, potassium hydroxide, and chromic acid.

13. The process according to claim 1, wherein:
   the alkali metal chromate has a particle size of less than 1000 μm, and
   the temperature for reacting the alkali metal chromate with the gaseous ammonia is 200 to 500° C.

14. The process according to claim 1, wherein:
   the alkali metal chromate has a particle size of less than 300 μm,
   the reaction of the alkali metal chromate with the gaseous ammonia is started at a temperature of 200 to 300° C. and is increased continuously or step wise, and the process further comprises removing samples of the reaction product during the reaction of the alkali metal chromate with the gaseous ammonia, forming a suspension of the sampled product in water, checking the pH of the suspension, and ending the reaction of the alkali metal chromate with the gaseous ammonia when the pH of a resulting suspension of the reaction product reaches at least 11.

15. The process according to claim 14, wherein the reaction is ended when the pH of a resulting suspension of the reaction product reaches at least 13.

16. The process according to claim 14, wherein:
the alkali metal chromate is sodium dichromate, sodium dichromate dihydrate or potassium dichromate,
the temperature for reacting the alkali metal chromate with the gaseous ammonia is 200 to 500° C.,
the acid is carbon dioxide,
after isolating the hydrolysis product, the hydrolysis product is further washed with water mixed with an acid to reduce the pH, and
after calcining, the method further comprises:
suspending the calcined product in water,
washing the calcined product with water one or more times,
subsequently drying the calcined product, and
thereafter milling the calcined product.

* * * * *